June 24, 1930.  F. R. MOSER, JR  1,765,691
WEIGHING SCALE
Filed March 20, 1929
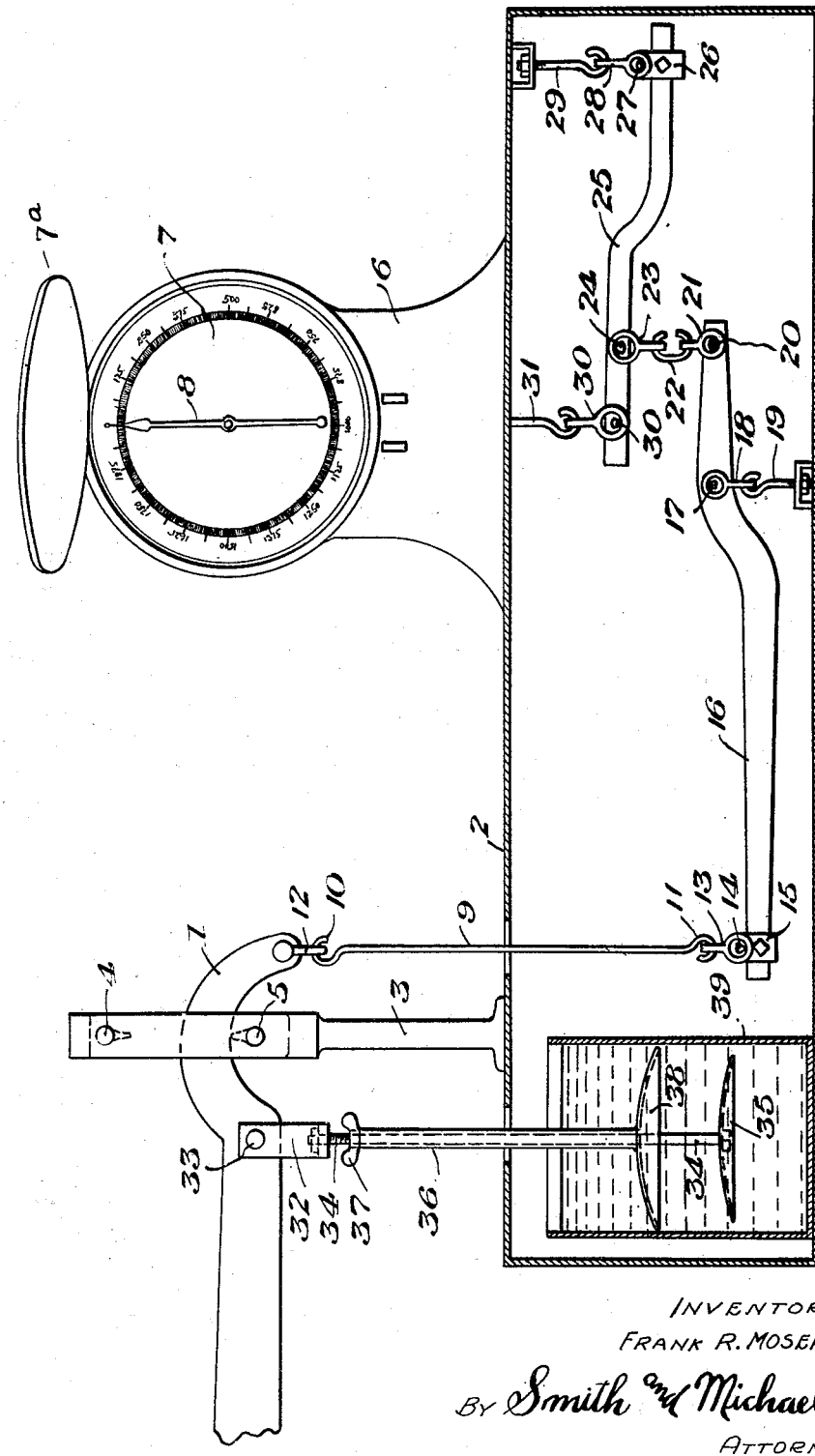
INVENTOR:
FRANK R. MOSER, JR
By Smith and Michael,
ATTORNEYS.

Patented June 24, 1930

1,765,691

UNITED STATES PATENT OFFICE

FRANK R. MOSER, JR., OF ST. LOUIS, MISSOURI, ASSIGNOR TO ST. LOUIS SCALE CORPORATION, OF ST. LOUIS, MISSOURI, A CORPORATION OF MISSOURI

WEIGHING SCALE

Application filed March 20, 1929. Serial No. 348,487.

My invention relates to weighing scales, and has particular reference to an improved attachment for scales, adapted to indicate the weight of materials or objects being weighed on said scale.

It is an object of my invention to provide an indicating device adapted for attachment to scales of the beam type, and in which the indicating device can be readily attached and detached to and from the scale beam without difficulty, and without affecting the balance of the beam and its associated parts.

It is a further object of my invention to provide an indicating device adapted for ready attachment to the outer or free end of a scale beam and including a system of pivoted levers for accurately and effectively transmitting movements of the scale beam to the indicator.

It is a further object of my invention to associate with the scale beam and indicator, an improved dash-pot of novel construction adapted to decrease the vibrations of the scale beam so that the indicator comes quickly to rest at the proper point during the weighing operation.

It is a still further object of my invention to provide an indicating attachment for scales that is simple in construction, cheap and easy to manufacture and assemble, and highly efficient in the purposes for which designed.

Referring to the accompanying drawing wherein is shown a preferred embodiment of my invention:—

The figure represents a side elevation, partly in section, of a portion of the outer or free end of a scale beam having my improved indicating device attached thereto.

Referring in detail to the drawings, the numeral 1 designates the outer or free end of a scale beam forming a part of a scale of any improved or preferred construction, not shown, and primarily intended for heavy and rapid weighing, such as in coal mines, coal yards, freight yards, ship docks, material depots, asphalt plants, etc. The numeral 2 designates a rectangular, box-like structure, on the upper surface of which is mounted a standard 3, having its upper portion slotted to accommodate the vertically-moving outer or free end of the scale beam 1, and having the usual upper and lower stop members 4 and 5 respectively, for limiting the vertical movement of the scale beam 1. Located on the upper surface of the box-like structure 2 is an indicating device 6, including a dial 7 having a circle of graduations preferably calibrated into ten pound divisions and adapted to indicate up to and including two thousand pounds. A pointer 8 is associated with the dial and is caused to traverse the garduations in a degree depending upon and corresponding to the vertical movements of the scale beam 1, the movements of the beam being transmitted to the pointer 8 through the instrumentality of mechanism to be hereinafter described. The internal mechanism of the indicating device 6 may be of any conventional or preferred construction including automatic load-offsetting or load counterpoising mechanism (not shown). In order to protect the dial face of the indicating device, I provide a cover member 7ᵃ hinged at the top of the dial face and adapted to be moved to either expose the dial face as shown in the drawing, or to overlie the said dial face to protect the same.

A link 9, having hooked upper and lower ends 10 and 11 respectively, has its upper end 10 connected to a loop 12 depending from the end of the scale beam 1, and extends downwardly through an opening in the top of the box-like structure 2 where its lower end 11 is connected to a stirrup 13, which has its looped ends pivotally mounted on an inverted knife-edge pivot 14, carried by an adjustable nose-iron 15, mounted near one end of a horizontally-disposed lever 16. Near the opposite end of the lever 16, is a knife-edge 17 which is engaged by an inverted stirrup 18, rigidly secured to the bottom of the box-like structure 2 by a hooked link 19. An inverted knife-edge pivot 20 is located at the end of the lever 16, and is engaged by a stirrup 21, connected by a link 22 to an inverted stirrup 23, pivotally mounted on a knife-edge pivot 24 positioned near one end of a longitudinally disposed lever 25. One end of the lever 25 has adjustably mounted thereon a nose-iron 26, which carries an inverted knife-edge pivot 27, engaged by the looped ends of a stirrup 28, which is rigidly secured to the top of the box-like structure 2 by a hooked link 29. An inverted knife-edge pivot 30 is carried at the opposite end of the said lever 25, and is engaged by the looped ends of a stirrup 30ª, which is connected to the link 31 of suitable mechanism, not shown, within the indicator 6, whereby vertical movements of the scale beam 1 are transmitted through the link 9, lever 16 and lever 25 to the indicator 6 to actuate the pointer 8 to indicate the extent of movement of the scale beam 1 and to thus indicate in pounds or other denominations, the weight of the material or article being weighed by the scale mechanism.

Near the outer or free end of the scale beam 1, is attached a U-shaped member 32, which is pivotally connected to the said beam by means of a readily-removable transverse bolt or screw 33. Depending from the U-shaped member 32, is a vertically-extending screw-threaded rod 34, which carries at its lower end a disk or head 35. Surrounding the rod 34 is an internally threaded sleeve 36 which has screw threaded engagement with the rod 34 and which, by means of the thumb-nut 37 formed integrally with the sleeve 36, may be adjusted vertically with respect to said rod. At the lower end in the sleeve 36 is a disk or head 38, and the two disks or heads 35 and 38 are positioned within a suitable receptacle 39 containing glycerin, oil or other substance of a similar consistency, which will retard the vertical movements of the two heads as they move up and down within the receptacle 39. This device therefore functions as a dash-pot and, due to its connection with the scale beam 1, acts to dampen or decrease the vibrations of the beam, and thus assists in causing the indicator 8 to come quickly to rest at the proper point on the indicator during the weighing operation. It is apparent that the "dash-pot" or braking effect of the liquid within the receptacle 39, on the heads 35 and 38 and consequently on the movements of the scale beam 1, can be adjusted by varying the distance between the heads 35 and 38, which is readily accomplished by turning the thumb nut 37 to move the sleeve 36 axially on the rod 34, to thus cause the head 38 to move toward or away from the head 35, it being understood that the greater the distance between the two heads, the greater will be the "dash-pot" or braking effect upon the heads and their associated mechanism as the heads are moved through the liquid within the receptacle 39. The diameter of each of the heads 35 and 38 is slightly less than the internal diameter of the receptacle 39 so that the liquid can by-pass through the annular space between the periphery to the heads and the inner wall of the receptacle, and preferably the diameter of the head 35 is slightly less than that of the head 38. By properly manipulating the thumb nut 37, it will be apparent that the action of the dash-pot can be regulated and controlled to effectively decrease the vibration of the scale beam 1 without in any way affecting the accuracy of the pointer 8 during the weighing operation.

It will thus be seen that I have provided an indicating device adapted for quick and ready attachment to the scale beam of a weighing scale of any conventional or preferred construction. All that is necessary to effect the attachment of my improved indicating device to a selected scale beam is to attach the link 9 to the loop 12 of the beam and to attach the U-shaped member 32 to the scale beam by means of the transverse bolt or screw 33. During the weighing operation, the vertical movements of the scale beam 1 are limited by the upper and lower stop members 4 and 5 respectively, and such movements are transmitted through the link 9, lever 16, lever 25, to the operating mechanism of the indicator 6. During the weighing operation the vibrations of the scale beam 1 are materially dampened or decreased by the dash-pot action of the mechanism above described, which mechanism causes the pointer 8 to promptly and accurately traverse the graduations to indicate the weight of the materials or articles placed on the scale platform. The heads 35 and 38 may be adjusted to insure a proper "dash-pot" or braking action and such adjustment may be accomplished in a manner to prevent any interference with the accurate movements of the indicating mechanism. When it is desired to detach the indicating mechanism from the scale beam, this can be readily accomplished by removing the transverse pin 33 which will permit the ready detachment of the U-shaped member 32, and unhooking the upper end 10 of the link 9 from the loop 12 at the end of the beam, the attachment and detachment of my improved indicating means in no way affecting the accuracy or balance of the scale mechanism.

It is to be understood that the form of my invention herein shown and described is to be taken as a preferred example of the same and that various changes in the shape, size and arrangement of parts may be resorted to without departing from the spirit of my invention or the scope of the subjoined claim.

Having described my invention, I claim:

1. An indicating attachment for scales of the beam type, comprising a casing, an indicating mechanism mounted on the casing, a system of levers within the casing and connected to said indicating mechanism, a link extending through the casing and attached to the end of the scale beam and to the system of levers, and a dash-pot attached to the said beam adjacent the end thereof to decrease the vibrations of the beam during the weighing operation.

2. An indicating attachment for scales of the beam type comprising a casing, an indicating mechanism mounted on the casing, a system of levers within the casing and connected to said indicating mechanism, a link extending through the casing and attached to the end of the scale beam and to the system of levers, a rod depending from the scale beam, a head on said rod and a liquid-containing receptacle within the casing adapted to receive said rod and head, the liquid within said receptacle retarding the movements of the head within the receptacle to thereby decrease the vibrations of the scale beam during the weighing operation.

3. An indicating attachment for scales comprising a casing; an indicating mechanism mounted on the casing; a link depending from said indicating mechanism; a longitudinally-extending lever pivotally connected at one end to the said link and at its other end to the casing; and a second longitudinally-extending lever disposed within the casing below the first lever, having one end pivotally supported from an intermediate point on said first lever, its opposite end pivotally connected to the operating mechanism of the scale and being pivotally connected at an intermediate point to the casing, whereby movements of said scale are transmitted through said lever to the indicating mechanism.

4. An indicating attachment for scales of the beam type, comprising a casing; an indicating mechanism mounted above the top of said casing; a link depending from the indicating mechanism; a longitudinally extending lever pivotally connected at one end to said link and having its opposite end pivotally supported from the top of the casing; a second longitudinally-extending lever disposed within the casing below the first lever, having one end pivotally supported from an intermediate point on said first lever, its opposite end pivotally connected to the scale beam, and being pivotally connected at an intermediate point to the bottom of the casing, whereby movements of said scale are transmitted through said first lever and through said second lever to the indicating mechanism.

In testimony whereof I hereunto affix my signature.

FRANK R. MOSER, Jr.